United States Patent
Budko et al.

(10) Patent No.: US 11,030,618 B1
(45) Date of Patent: Jun. 8, 2021

(54) AUTHENTICATION AND PERSONAL DATA SHARING FOR PARTNER SERVICES USING OUT-OF-BAND OPTICAL MARK RECOGNITION

(71) Applicant: Winkk, Inc., Atherton, CA (US)

(72) Inventors: Renata Budko, Los Altos, CA (US); Dmitry Feld, Santa Clara, CA (US); Konstantin Kalinin, Rostov-on-Don (RU); Mikhail Petrushan, Rostov-on-Don (RU)

(73) Assignee: Winkk, Inc., Atherton, CA (US)

( * ) Notice: Subject to any disclaimer, the term of this patent is extended or adjusted under 35 U.S.C. 154(b) by 0 days.

(21) Appl. No.: 15/721,899

(22) Filed: Sep. 30, 2017

Related U.S. Application Data

(60) Provisional application No. 62/402,728, filed on Sep. 30, 2016.

(51) Int. Cl.
  *G06Q 20/38* (2012.01)
  *H04L 29/06* (2006.01)
  (Continued)

(52) U.S. Cl.
  CPC ..... *G06Q 20/38215* (2013.01); *G06K 7/1417* (2013.01); *G06Q 20/385* (2013.01);
  (Continued)

(58) Field of Classification Search
  CPC .................................................. G06Q 20/3274
  (Continued)

(56) References Cited

U.S. PATENT DOCUMENTS

| 8,363,259 B2 | 1/2013 | Gilboa |
| 2003/0016844 A1 | 1/2003 | Numaoka |

(Continued)

FOREIGN PATENT DOCUMENTS

| CN | 107924475 A | 4/2018 |
| WO | 2016179433 A1 | 11/2016 |

OTHER PUBLICATIONS

Erdem Alkim et al., "Post-Quantum key exchange—a new hope", International Association for Cryptologic Research, vol. 20161116:063839, Nov. 16, 2016, pp. 1-22.
(Continued)

*Primary Examiner* — Chinedu C Agwumezie
(74) *Attorney, Agent, or Firm* — Haverstock & Owens LLP

(57) ABSTRACT

Disclosed are methods and apparatuses for creating a verified mutually authenticated transaction between a service provider and an on-line identity for a physical client person. A dynamic optical mark may be displayed on a device screen where the physical client person is using a web service. The dynamic optical mark may be recognized via scanning the dynamic optical mark by a personal mobile device equipped with a camera. The verified mutually authenticated transaction between the service provider and the on-line identity for the physical client person may be used for sharing personal data of the physical client person by using out-of-band optical mark recognition of the dynamic optical mark. The verified mutually authenticated transaction may be initiated with a time-limited one-time password comprising a sequence of numbers encoded in the dynamic optical mark.

17 Claims, 2 Drawing Sheets

(51) Int. Cl.
*G06K 7/14* (2006.01)
*G06Q 20/40* (2012.01)

(52) U.S. Cl.
CPC ..... *G06Q 20/3823* (2013.01); *G06Q 20/4014* (2013.01); *H04L 63/0838* (2013.01); *G06Q 20/388* (2013.01)

(58) Field of Classification Search
USPC ..................................................... 705/75, 67
See application file for complete search history.

(56) References Cited

U.S. PATENT DOCUMENTS

| | | |
|---|---|---|
| 2006/0196950 A1 | 9/2006 | Kiliccote |
| 2009/0194592 A1 | 8/2009 | Ming et al. |
| 2009/0315671 A1* | 12/2009 | Gocho ................ H04N 1/4426 340/5.8 |
| 2011/0233284 A1 | 9/2011 | Howard |
| 2013/0111208 A1* | 5/2013 | Sabin ..................... G06F 21/36 713/171 |
| 2014/0040628 A1* | 2/2014 | Fort .................... H04L 63/0869 713/182 |
| 2016/0239657 A1* | 8/2016 | Loughlin-Mchugh ...................... H04L 63/0807 |
| 2017/0041309 A1* | 2/2017 | Ekambaram ............ G06F 21/44 |
| 2018/0114221 A1* | 4/2018 | Karantzis ............. G06Q 20/385 |

OTHER PUBLICATIONS

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report dated Aug. 11, 2016, for PCT Application No. PCT/US2016/031055, filed May 5, 2016, five pages.

International Search Report dated Oct. 9, 2019, for PCT Application No. PCT/US2019/041871, filed Jul. 15, 2019, four pages.

* cited by examiner

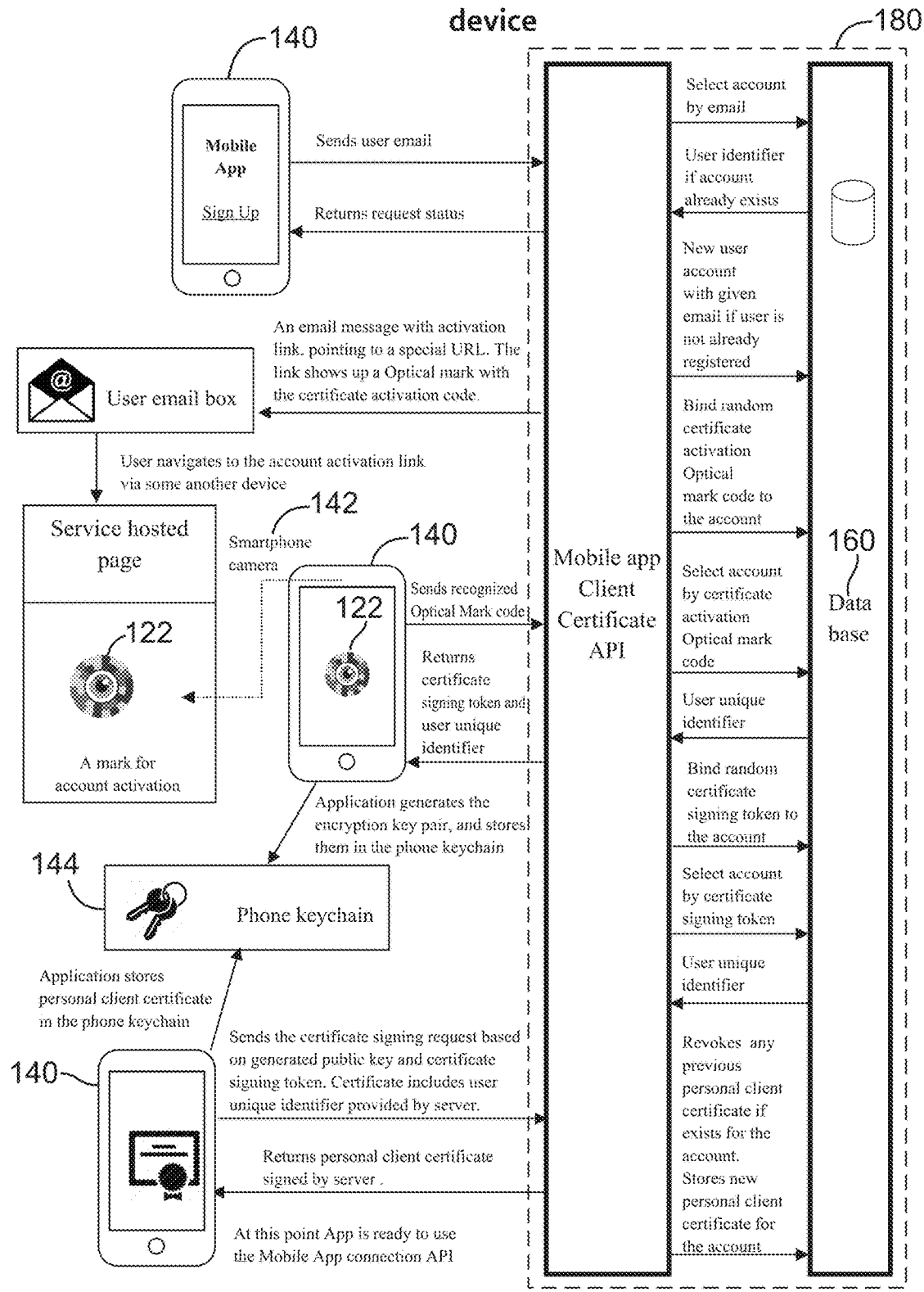
Fig. 1 Data Flow for user registration or user authorization at another device

Fig. 2 Data Flow for user authorization at partner web service
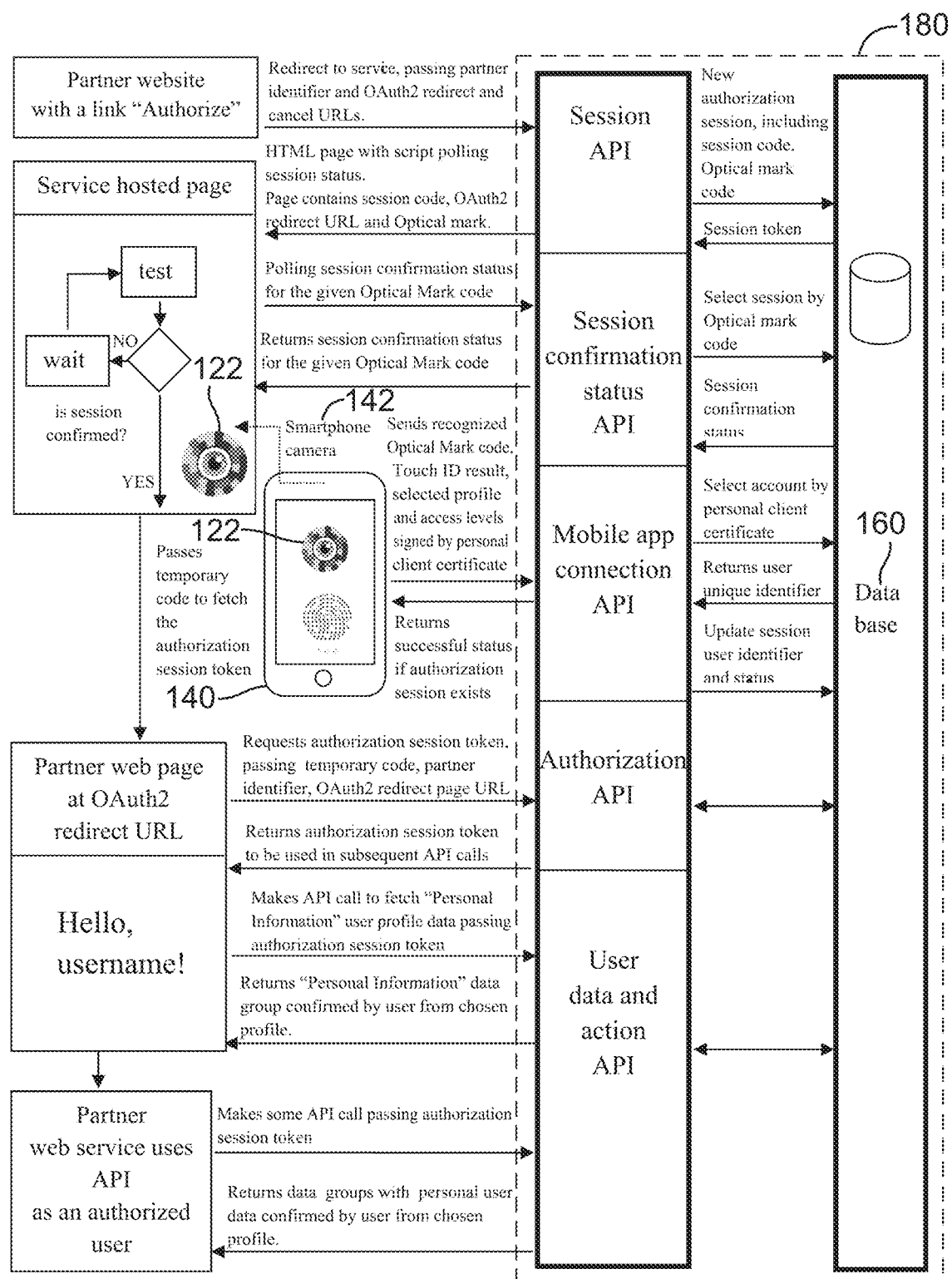

AUTHENTICATION AND PERSONAL DATA SHARING FOR PARTNER SERVICES USING OUT-OF-BAND OPTICAL MARK RECOGNITION

CROSS-REFERENCE TO RELATED APPLICATIONS

This application claims benefit of U.S. Provisional Patent Application No. 62/402,728, filed Sep. 30, 2016, which is hereby incorporated by reference in its entirety for all purposes.

BACKGROUND OF THE DISCLOSURE

Authentication is an important aspect of on-line communication between various parties, such as service providers and individual users. In order to use a web service offered by a service provider, a user may need to confirm his identity to the service provider. The service provider may implement an authentication service locally or use an external identity provider to confirm the user's identity. When using an external identity provider, the service provider may request the identity confirmation via a standard API and may receive a verified user identity as a response. When using the web service, the user may share personal data with the service provider.

A common way for implementing authentication for both local implementations and external identify provider services is based on the use of a username and a password as authentication credentials. Password-based authentication, however, can be problematic. Usernames or passwords can be forgotten, stolen, or unintentionally exposed.

SUMMARY OF THE DISCLOSURE

This disclosure provides methods and apparatuses for creating a verified mutually authenticated transaction between a service provider and an on-line identity for a physical client person. A dynamic optical mark may be displayed on a device screen where the physical client person is using a web service. The dynamic optical mark may be recognized via scanning the dynamic optical mark by a personal mobile device equipped with a camera.

The verified mutually authenticated transaction between the service provider and the on-line identity for the physical client person may be used for sharing personal data of the physical client person by using out-of-band optical mark recognition of the dynamic optical mark. The verified mutually authenticated transaction may be initiated with a time-limited one-time password comprising a sequence of numbers encoded in the dynamic optical mark.

The on-line identity for the physical client person may be authenticated to the web service by signing a transaction completion request with a private key and a corresponding public key stored within the web service may be used for verification. The on-line identity may be verified by personal biometry. The private key may be stored at a hardware encrypted storage (TPM) of the personal mobile device.

An authorization assertion may be constructed and passed to the service provider. The authorization assertion may be in a form of a OAuth2 token, SAML token, RP token or another provider supported technology.

BRIEF DESCRIPTION OF THE DRAWINGS

FIG. 1 illustrates exemplary processes for user registration or user authorization.

FIG. 2 illustrates an exemplary process for user authorization at a partner web service.

DETAILED DESCRIPTION

In the following description of examples, reference is made to the accompanying drawings which form a part hereof, and in which it is shown by way of illustration specific examples that can be practiced. It is to be understood that other examples are can be used and structural changes can be made without departing from the scope of the disclosed examples.

According to one aspect, a cloud-based service, or cloud service, is described which implements means to create a verified mutually authenticated transaction between a service provider and an on-line identity securely tied to a physical person with a custom mandatory security step integrated. In one example, the custom step involves displaying of a specially formed dynamic optical mark on the device where client is using web service (e.g., authorized email), and recognition of this mark via scanning it by client personal smartphone.

The client personal smartphone may hold a personal client certificate created during enrollment procedure. The personal smartphone may manage client authorization, provide full control of the stored personal data, manage the access to personal data from third-parties. Client can revoke the third-party access at any time. On the other hand, the communication between client personal smartphone and the cloud service (implemented via, e.g., an API layer and a database) may be encrypted by personal client certificate and can be performed by public networks without security flaw too.

Instead of directly providing authorization credentials, a client may use his/her personal smartphone as identity provider after mark recognition. User may specify the part of the personal data that he/she wants to share with the third-party. No sensitive data (including client credentials, client profile list, etc.) other than explicitly allowed by user for this third-party may be transferred through the computer and network used for accessing of third-party service. No direct communication may be performed between the computer and client smartphone apart from optical mark recognition. Sensitive data management may be leveraged to the client smartphone.

Client may have a number of personal data sets (profiles) stored in the single account. When a personal data is requested by the third-party, the client may have the ability to choose the profile to be shared.

Additional security level can be enabled at the smartphone by using available built-in capabilities such as device-wide password protected lock, retina scanning, fingerprint scanning. Moreover, additional security level can be enabled for different profiles separately.

In one example, the solution uniquely features ability to initiate each transaction with a sequence of numbers encoded in a proprietary dynamic optical code (see, e.g., U.S. Ser. No. 62/248,605, entitled "Palette-Based Optical Recognition Code Generators and Decoders," the entire content of which is incorporated by reference herein). These numbers may represent the time-limited one-time password (TOTP) represented in a form of a series of static optical marks. Only third-parties who are authenticated to the service can initiate transactions. Dynamic nature of the optical code may provide sufficient encoding depth and channel robustness for the high level of password security.

To complete the transaction, the code may be read through a mobile phone camera. The optical nature of the code recognition may create an out-of-band transaction verification channel air-gapped from the network over which the digital service is provided.

Client's on-line identity may authenticate to the service by signing its transaction completion request with its private key stored in the phone's hardware encrypted storage (TPM). Corresponding public key needed for verification may be stored within the service.

Once the client is authenticated, authorization assertion, which could take a form of a OAuth2 token, SAML token, RP token or another provider supported technology, may be passed to the third-party, creating a closed-loop process.

In case the mobile phone is compromised, a new set of private/public key pair may be issued. A key pair may correspond to the mobile device, or can be created individually for each of the on-line identities (profiles) registered for the physical person.

Transactions that require lower level of security can implement the protocol partially. Transactions that require multiple independent providers can also be supported.

The cloud service can be implemented via, e.g., API layer(s) and database(s) that are run on server(s), such as Linux server(s). The client personal smartphone or mobile phone may be examples of a personal mobile device. The functionalities of each computing device mentioned in this disclosure (e.g., server, personal mobile device, computer) can be performed by suitable logic circuitry in or for that computing device. For example, suitable logic circuitry may include processor(s) that, when executing instruction implemented in software program(s) stored in processor-readable storage medium(s) (e.g., memory) in or for that computing device, performs that computing device's functionalities. As another example, suitable logic circuitry may include hardware logic circuitry, such as a programmable logic device or an application-specific integrated circuit, implementing logic designs that provide that computing device's functionalities. As yet another example, suitable logic circuitry for that computing device may include an implementation that combines both processor(s) running software and hardware logic circuitry.

The following workflows describe exemplary processes of partner registration, user registration, user authorization on the example of OAuth2 protocol used for data sharing.

Third-Party Partner Registration

To get personal information about particular client, third-party partner may need to be registered providing administrator email, service name, service base URL, URL for OAuth2 redirect required access level and arbitrary secret key. These registration data may be stored in the database 160.

Third-party administrator may provide additional information on how to verify the owner of the domain and payment information.

FIG. 1 illustrates an exemplary process for user registration at mobile application.

Workflow for User Registration at Mobile Application

User may install the application 120 at his smartphone 140 and start it.

A Sign Up view of application 120 may be displayed.

User may navigate to the Sign Up screen and follow the sign up procedure providing his email.

Application 120 may send the given email to the cloud service 180 over TLS connection using temporary asymmetric RSA key pair for this communication. TLS connection can also be known as SSL connection.

An account record may be created for the user, having stored user email. An activation link may be sent to user email.

A message may be shown to the user informing him that the enrollment procedure is pending and he should check email. A scanner view of the application 120 may be displayed with all UI controls related to user profile disabled.

User may navigate to the activation link on another computer. A special dynamic optical mark 122 for enrollment procedure may be displayed. Optical mark 122 may encode registration session identifier.

User may scan the given optical mark 122 by pointing smartphone camera 142 to the optical mark 122 having application 120 in the foreground.

Application 120 may send the scanned code to the cloud service 180 over TLS (or SSL) connection using temporary asymmetric RSA key pair for this communication.

If recognized code matches to stored registration session identifier then cloud service 180 may return the unique user identifier and certificate signing token to the application 120.

Application 120 may generate a new personal asymmetric RSA key pair and store the private key at the smartphone 140 in protected storage space 144.

X.509 certificate signing request may be created using the personal key pair and given user identifier.

Application 120 may send the X.509 certificate signing request and certificate signing token to the cloud service 180 over TLS (or SSL) connection using temporary asymmetric RSA key pair for this communication.

Cloud service 180 may match user identifier with X.509 certificate signing request and certificate signing token, sign the X.509 certificate and return signed personal X.509 certificate to the application 120.

Application 120 may store the personal X.509 certificate at the smartphone 140 in protected storage space 144 and enable UI controls related to user profile.

User may create and fill in at least one profile in the application 120.

Application 120 may send profile data to the cloud service 180 over TLS (or SSL) connection using personal X.509 certificate.

Cloud service 180 may identify user by personal X.509 certificate and store the profile information.

Application 120 may be ready to scan optical marks to perform user authorization at third-parties.

Workflow for User Certification Invalidation

Personal user certificate invalidation may be performed at the following circumstances.
   a. Administrator manually revokes the certificate for particular user via Administrative Tool.
   b. User installs the application 120 to another device and activates a new personal certificate, the previous one becomes revoked.
   c. Personal user certificate is expired.

When mobile application 120 tries to perform any request over TLS (or SSL) connection using revoked/expired personal X.509 certificate, the cloud service 180 may return special error code denoting the using certificate is invalid and should be deleted.

Application 120 may check if the server certificate matches the one stored at the application 120, removes certificate and RSA key pair from the keychain and show Sign Up view.

User may have to follow the "Workflow for user authorization at the application using another device (or in the case of personal X.509 certificate revocation/expiration)" below.

FIG. 1 also illustrates an exemplary process for user authorization at the application using another device (or in the case of personal X.509 certificate revocation/expiration)

Workflow for User Authorization at the Application Using Another Device (or in the Case of Personal X.509 Certificate Revocation/Expiration)

User may install the application 120 at a new smartphone 140 and start it, or User may start the application 120 having invalid (e.g., revoked or expired) personal X.509 certificate.

A Sign Up view of the application 120 may be displayed.

User may navigate to the Sign Up screen and may follow the sign up procedure providing his email.

Application 120 may send the given email to the cloud service 180 over TLS (or SSL) connection using temporary asymmetric RSA key pair for this communication.

Cloud service 180 may find user account by given email. An activation link may be sent to user email.

A message may be shown to the user informing him that the enrollment procedure is pending and he should check email. A scanner view of the application 120 may be displayed with all UI controls related to user profile disabled.

User may navigate to the activation link on another computer. A special dynamic optical mark 122 for enrollment procedure may be displayed.

User may scan the given optical mark 122 by pointing smartphone camera 142 to the optical mark 122 having application 120 in the foreground.

Application 120 may send the scanned code to the cloud service 180 over TLS (or SSL) connection using temporary asymmetric RSA key pair for this communication.

Cloud service 180 may return the unique user identifier and certificate signing token to the application 120.

Application 120 may generate a new personal asymmetric RSA key pair and store the private key at the smartphone 140 in protected storage space 144.

X.509 certificate signing request may be created using the personal key pair and given user identifier.

Application 120 may send the X.509 certificate signing request and certificate signing token to the cloud service 180 over TLS (or SSL) connection using temporary asymmetric RSA key pair for this communication.

Cloud service 180 may match user identifier with X.509 certificate signing request and certificate signing token, sign the X.509 certificate and return signed personal X.509 certificate to the application 120.

Application 120 may store the personal X.509 certificate at the smartphone 140 in protected storage space 144 and enable UI controls related to user profile.

User may create and fill in at least one profile in the application 120.

Application 120 sends profile data to the cloud service 180 over TLS (or SSL) connection using personal X.509 certificate.

Cloud service 180 may identify user by personal X.509 certificate and store the profile information.

Application 120 may be ready to scan optical marks to perform user authorization at third-parties.

FIG. 2 illustrates an exemplary process for user authorization at a partner web service.

Workflow for User Authorization at a Partner Web Service

User may click at the special link at the partner web service.

Third-party may redirect user browser to a special web page for custom authorization.

A new authorization session may be created in the cloud service 180. A random session code, random dynamic optical mark code, access token, and one-time OAuth2 code may be generated and stored in the authorization session record.

The custom authorization page may display special dynamic optical mark 122 to user and display information on which data will be available to the partner. A polling may be performed to check if mark 122 is already recognized.

User may start the application 120 and direct smartphone camera 142 to the dynamic optical mark 122 displayed at the page.

Application 120 may recognize the dynamic optical mark 122 and send its code over TLS (or SSL) connection using personal X.509 certificate.

Cloud service 180 may identify source user by personal X.509 certificate and associate user identifier with the authorization session.

If user has already authorized with this partner:

Cloud service 180 may use the selected profile and access levels from the previous authorization session at this partner.

If user has not already authorized with this partner:

Cloud service 180 may return "profile" state to the application 120.

Application 120 may display the profile choosing view with profile list and the access level controls.

User may select the profile he wants to be used by this partner. Before actual authorization, the user may, if he deems it fit, adjust the access levels.

Application 120 may send the selected profile identifier, access levels over TLS (or SSL) connection using personal X.509 certificate.

Cloud service 180 may identify source user by personal X.509 certificate and binds the profile selection and access levels to the authorization session.

If the selected profile and access levels require multifactor procedure:

Cloud service 180 may return "multifactor" state to the application 120.

Application 120 may display security screen with additional verification procedure implemented (for example, fingerprint scan).

User may go through the additional verification procedure.

Application 120 may send the additional verification result over TLS (or SSL) connection using personal X.509 certificate.

Cloud service 180 may identify source user by personal X.509 certificate and the authorization session and allow the process to continue.

Cloud service 180 may return "finish" state to the application 120.

Application 120 may return to the main scanner view.

Custom authorization page may redirect user browser back to the partner web service (HTTPS back redirect URL is mandatory) with the one-time OAuth2 code in the GET parameter.

Partner web service may make a request to cloud service 180 via TLS (or SSL) connection providing partner web service identifier, given one-time OAuth2 code and secret partner key.

Cloud service 180 may search the given one-time OAuth2 code and returns the stored authorization session access token to the partner if match and the state of the authorization session is active.

Partner web service may now have an access token which may enable it to make requests to the cloud service 180.

Partner web service may make a request to cloud service 180 using given access token to fetch user unique identifier, first and last name and any other required private information. Cloud service 180 may return requested data if the state of the authorization session is active.

User may see his name at the partner website and can act as an authorized user.

Partner website may contain a link that makes user to logout. This link may pass the session code for the authorization session to be invalidated in the cloud service 180. Alternatively, user can break the authorization session at the partner web service at any time using "Remove Application" feature in the mobile application 120.

It should be noted that the practice of the present disclosure is not limited to the above-described examples. Those of ordinary skill in the art may perform modification or variation in accordance with the foregoing description, and all such modifications and variations should fall into the scope of the appended claims of the present disclosure.

What is claimed is:

1. A method comprising:
   generating, by a computing device, an optical mark including at least two concentric circles;
   calibrating, by the computing device, the optical mark by comparing at least three different colors within a calibration region within the at least two concentric circles to an encoding palette;
   generating, by the computing device, a portion of the optical mark within the at least two concentric circles, comprising a plurality of segments wherein each segment of the plurality of segments comprises one color of the at least three different colors;
   encoding, by the computing device, the portion based on the at least three different colors including associating each color with an optical code comprising a number;
   orienting, by the computing device, the optical mark, by positioning a registration mark relative to the portion;
   displaying, by the computing device, the optical mark on a device screen of the computing device;
   recognizing, by a mobile device, the optical mark displayed on the device screen;
   detecting, by the mobile device, the optical mark using the registration mark and the calibration region by identifying and assigning values to the plurality of segments of the segmented portion and decoding the optical code based on the assigned values;
   authenticating, by the mobile device, an on-line identity for a client based on the optical code of the optical mark and based on an on-line identity of the client;
   authorizing, by the computing device, the client to access a web service of a web service provider in response to the authentication of the on-line identity for the client; and
   displaying, by the computing device, on the device screen of the computing device a visual indication of the authorization of the mobile device to access the web service of the web service provider.

2. The method of claim 1, wherein recognizing the optical mark comprises recognizing the optical mark over an air-gapped channel between the device screen and the mobile device.

3. The method of claim 1, wherein the optical code comprises a one-time password.

4. The method of claim 1, further comprising:
   storing, by the mobile device, a first key, wherein authenticating the on-line identity for the client comprises signing a transaction completion request with the first key stored in the mobile device;
   storing, by a computer of the web service provider, a corresponding second key within the web service; and
   verifying, by the mobile device, the on-line identity for the client by using the corresponding second key.

5. The method of claim 4, wherein verifying, by the mobile device, the on-line identity for the client comprises evaluating personal biometry.

6. The method of claim 4, wherein the first key comprises a private key, and wherein the second key comprises a public key.

7. The method of claim 5, wherein evaluating the personal biometry comprises retina scanning or fingerprint scanning.

8. The method of claim 4, further comprising:
   constructing, by the mobile device, an authorization assertion; and
   passing, by the mobile device, the authorization assertion to the web service provider.

9. The method of claim 8, wherein passing the authorization assertion comprises passing an OAuth2 token, SAML token, or RP token to the web service provider.

10. The method of claim 1, wherein recognizing the optical mark comprises scanning the optical mark by a camera of the mobile device.

11. A device comprising:
    a processor;
    a non-transitory memory coupled to the processor and storing an application, the application when executed by the processor causes the processor to perform the following:
    generating an optical mark, including at least two concentric circles;
    calibrating the optical mark by comparing at least three different colors within a calibration region within the at least two concentric circles to an encoding palette;
    generating a portion of the optical mark within the at least two concentric circles, comprising a plurality of segments wherein each segment of the plurality of segments comprises one color of the at least three different colors;
    encoding the portion based on the at least three different colors including associating each color with an optical code comprising a number;
    orienting the optical mark upon detection, by positioning a registration mark relative to the portion;
    displaying the optical mark on a device screen of the computing device; and
    displaying on the device screen a visual indication of the authorization of a client to access the web service of the web service provider.

12. The device of claim 11, wherein the optical code comprises a one-time password.

13. A system comprising:
    a computing device comprising:
    a device screen;
    a first processor; and a first non-transitory memory coupled to the first processor and storing a first application, the first application when executed by the first processor causes the first processor to perform the following:
  generating an optical mark including at least two concentric circles;
  calibrating the optical mark by comparing at least three different colors within a calibration region within the at least two concentric circles to an encoding palette;
  generating a portion of the optical mark within the at least two concentric circles, comprising a plurality of segments wherein each segment of the plurality of segments comprises one color of the at least three different colors;
  encoding the portion based on the at least three different colors including associating each color with an optical code comprising a number; and
  orienting the optical mark, by positioning a registration mark relative to the portion;
  displaying the optical mark on the device screen;
  authorizing a client to access a web service of a web service provider in response to authentication of an on-line identity for the client; and
  displaying on the device screen a visual indication of the authorization of the client to access the web service of the web service provider; and
a mobile device comprising:
  a second processor; and
  a second non-transitory memory coupled to the second processor and storing a second application, the second application when executed by the second processor causes the second processor to perform the following:
    recognizing the optical mark displayed on the device screen;
    detecting the optical mark using the registration mark and the calibration region by identifying and assigning values to the plurality of segments of the portion and decoding the optical code based on the assigned values; and
    authenticating an on-line identity for the client based on the optical code of the optical mark and based on an on-line identity of the client.

14. The system of claim 13, wherein recognizing the optical mark comprises recognizing the optical mark over an air-gapped channel between the device screen and the mobile device.

15. The system of claim 13, wherein, the second application when executed by the second processor further causes the second processor to perform the following:
  storing a first key, wherein authenticating the on-line identity for the client comprises signing a transaction completion request with the first key stored in the mobile device;
  storing a corresponding second key within the web service; and
  verifying the on-line identity for the client by using the corresponding second key.

16. The system of claim 15, wherein verifying the on-line identity for the client comprises evaluating personal biometry.

17. The system of claim 16, wherein evaluating the personal biometry comprises retina scanning or fingerprint scanning.

* * * * *